(12) United States Patent
Harbec et al.

(10) Patent No.: US 7,846,414 B2
(45) Date of Patent: Dec. 7, 2010

(54) METHOD FOR PRODUCING CARBON NANOTUBES USING A DC NON-TRANSFERRED THERMAL PLASMA TORCH

(75) Inventors: David Harbec, Montreal (CA); Jean-Luc Meunier, Montreal (CA)

(73) Assignee: McGill University, Montreal, Quebec (CA)

( * ) Notice: Subject to any disclaimer, the term of this patent is extended or adjusted under 35 U.S.C. 154(b) by 795 days.

(21) Appl. No.: 10/535,050

(22) PCT Filed: Nov. 17, 2003

(86) PCT No.: PCT/CA03/01779
§ 371 (c)(1),
(2), (4) Date: Jan. 30, 2006

(87) PCT Pub. No.: WO2004/046030
PCT Pub. Date: Jun. 3, 2004

(65) Prior Publication Data
US 2006/0127299 A1 Jun. 15, 2006

Related U.S. Application Data

(60) Provisional application No. 60/426,407, filed on Nov. 15, 2002.

(51) Int. Cl.
C01B 31/02 (2006.01)
(52) U.S. Cl. .................. 423/445 R; 204/173; 977/742; 977/842; 977/844
(58) Field of Classification Search .......... 977/734, 977/742, 840, 842, 844; 423/447.1, 447.3, 423/445 B, 249.1, 445 R; 204/173; 117/90
See application file for complete search history.

(56) References Cited

U.S. PATENT DOCUMENTS 5,147,998 A 9/1992 Tsantrizos et al. ....... 219/121.5
5,227,038 A 7/1993 Smalley et al. ............. 204/173

(Continued)

FOREIGN PATENT DOCUMENTS

CA 2 385 802 A1 11/2003

(Continued)

OTHER PUBLICATIONS

Smiljanic, O. et al., "Gas Phase Synthesis of SWNT in an Atmospheric Pressure Plasma Jet", *Conference at Nanotube in Postdam*, Germany, Jul. 22, 2001, p. 49 (Abstract), Poster No. 18, Slides of a Poster, Production of SWNT: Present Methods and Problems, et al.

(Continued)

*Primary Examiner*—Jennifer K Michener
*Assistant Examiner*—Carlos Barcena
(74) *Attorney, Agent, or Firm*—Ogilvy Renault LLP; Joan M. Van Zant

(57) ABSTRACT

The present invention provides a process for the manufacture of carbon nanostructures, the carbon nanostructures being selected from carbon nanotubes and carbon nano-onions. The method comprises the steps of injecting a carbon-containing gas into a plasma flame generated from a plasma forming gas to provide atomic carbon, which in the presence of in situ generated nanometer sized metal catalyst particles that act as nucleation points for growth of carbon nanostructures, produce the carbon nanostructures, and collecting the carbon nanostructures.

14 Claims, 15 Drawing Sheets

U.S. PATENT DOCUMENTS

| | | | | |
|---|---|---|---|---|
| 5,395,496 | A | | 3/1995 | Tsantrizos et al. .......... 204/173 |
| 5,482,601 | A | | 1/1996 | Ohshima et al. ............ 204/173 |
| 5,753,088 | A | | 5/1998 | Olk .............................. 204/173 |
| 5,985,232 | A | | 11/1999 | Howard et al. ............ 423/447.3 |
| 5,993,697 | A | * | 11/1999 | Cohen et al. ................ 252/502 |
| 6,063,243 | A | | 5/2000 | Zettl et al. .................. 204/164 |
| 6,083,469 | A | | 7/2000 | Leftin ..................... 423/445 B |
| 6,099,696 | A | | 8/2000 | Schwob et al. .............. 204/173 |
| 6,162,411 | A | | 12/2000 | Howard et al. ............. 423/445 |
| 6,221,330 | B1 | | 4/2001 | Moy et al. ............... 423/447.3 |
| 6,224,836 | B1 | | 5/2001 | Moisan et al. |
| 6,261,532 | B1 | | 7/2001 | Ono ........................ 423/447.3 |
| 6,303,094 | B1 | | 10/2001 | Kusunoki et al. ......... 423/447.1 |
| 6,331,209 | B1 | | 12/2001 | Jang et al. ....................... 117/90 |
| 6,333,016 | B1 | | 12/2001 | Resasco et al. .......... 423/447.3 |
| 6,350,488 | B1 | | 2/2002 | Lee et al. .................. 427/249.1 |
| 6,451,175 | B1 | | 9/2002 | Lal ............................ 204/173 |
| 6,455,021 | B1 | | 9/2002 | Saito ....................... 423/447.3 |
| 2001/0050219 | A1 | | 12/2001 | Anazawa et al. ............ 204/173 |
| 2002/0179564 | A1 | * | 12/2002 | Geobegan et al. .............. 216/7 |
| 2003/0211030 | A1 | | 11/2003 | Olivier et al. ............. 423/447.3 |
| 2006/0127299 | A1 | | 6/2006 | Harbec et al. ................ 423/445 |
| 2008/0124482 | A1 | | 5/2008 | Smiljanic et al. |
| 2008/0226536 | A1 | | 9/2008 | Smiljanic et al. |

FOREIGN PATENT DOCUMENTS

| | | |
|---|---|---|
| CA | 2505996 | 6/2004 |
| CA | 2 499 850 | 1/2006 |
| EP | 0 565 275 A1 | 10/1993 |
| JP | 07-061803 * | 3/1995 |
| JP | 09-188509 A1 | 7/1997 |
| JP | 2001-348215 A1 | 12/2008 |
| WO | WO 03/008331 A1 | 1/2003 |
| WO | WO 03/062146 A1 | 7/2003 |
| WO | WO 2004/046030 A1 | 6/2004 |

OTHER PUBLICATIONS

Boulos, M., et al., "Thermal Plasmas Fundamentals and Applications", vol. 1, Plenum Press, New York, 1994, 6-19.

Kabouzi, Y., et al., "Radial contraction of microwave-sustained plasma columns at atmospheric pressure", Journal of Applies Physics, vol. 91, No. 3, 1008-1019, Feb. 2002.

Guo, L., et al., "Control of the metal catalyst particles for CNT production in a supersonic DC thermal plasma torch", 17th Int. Symposium on Plasma Chemistry, Aug. 2005.

Feinman, J., et al., "Plasma Technology in Metallurgical Processing", Iron and Steel Society, Inc., Warrendale, 1987 17-26.

Nowakowska, H., et al., "Proparation characteristics of surface waves sustaining atmospheric pressure discharges: the influence of the discharge processes", J. Phys. D: App . . . , 1998.

Calzada, M., et al., Experimental investigation and characterization of the departure from local thermodynamic equilibrium along a surface-wave-sustained discharge at atmo . . . , Jul. 1996.

Harbec, D., et al., "A parametric study of carbon nanotubes production from tetrachloroethylene using a supersonic thermal plasma jet", Science Direct, (2007) 2054-2064.

Harbec, D., et al., "A parametric study of carbon nanotubes produced from the thermal plasma dissociation of tetrachloroethylene", Proceedings 17th Intl. Symposium on Plasm . . . , Jun. 2007.

Harbec, D., "Producing Carbon Nanotubes using the Technology of DC Thermal Plasma Torch", Thesis submitted to McGill University, Montreal, May 2006, 1-276.

Boulos, P., et al., "Industrial plasma engineering," Thermal Plasmas Fundamental and Applications, *Institute of Physics Publishing*, 1994, vol. 1, Table of Contents and Section 1.1.2.5, v-viii; 16-19.

Eschenbach, et al., "Plasma torches and plasma torch furnaces," *Plasma Techn. In Metallurgical Processing*, no date available, Chapter 7, 77-87, 1987.

Hahn, J., et al., "New continuous gas-phase synthesis of high purity carbon nanotubes by a thermal plasma jet," *Carbon*, 2004, 877-883.

Roth, J.R., Industrial Plasma Engineering, *Institute of Physics Publishing*, 1995, vol. 1, Principles, Tables of Contents, v-viii.

Smiljanic, O., "Gas-phase synthesis of SWNT by an atmospheric pressure plasma jet," *Chemical Physics Letts.*, 2002, 356, 189-193.

Tian, Y., et al., "Preparation of carbon nanotube material," *Derwent Publications*, 2002, 1 page (Abstract).

Wang, X., et al., "A novel route to multiwalled carbon nanotubes and carbon nanorods at low temperature," *J. Phys. Chem. B*, 2002, 106, 933-937.

Yoshikawa, H., "Manufacture of carbon monolayer nanotubes," *Chemical Abstract Service*, Accession No. 127:123749 CA, 1 page (Abstract), 1997.

Plasma Technology in Metallurgical Processing, Feinman, J. Ed., 1987 ( A Publication of the Iron and Steel Society, Inc.), See p. 57, where Fig. 5-23 illustrates Temperature and axial velocity isocontours (after Vardelle et al).

Vardelle at al., Plasma-Particle Momentum and Heat Transfer: Modelling and Measurements, AIChE Journal (vol. 29, No. 2), Mar. 1983, pp. 236-242.

H. Nowakowska, Z. Zakrzewski, M. Moisan, and M. Lubanski, Propagation characteristics of surface waves sustaining atmospheric pressure discharges: the influence of the discharge processes, J. Phys. D: Appl. Phys. 31, 1422-1432, 1998.

M.D. Calzada, M. Moisan, A. Gamero, A. Sola, Experimental investigation and characterization of the departure from local thermodynamic equilibrium along a surface-wave-sustained discharge at atmospheric pressure, J. Appl. Phys., 80, 1, 1996.

CRC Handbook of Chemistry and Physics, 70th edition, p. B-19 provided from http://en.wikipedia.org/wiki/Helium, Nov. 5, 2009.

Table A.1, p. 393 in: M.I. Boulos, P. Fauchais, E. Pfender, Thermal Plasmas Fundamentals and Applications, vol. 1, Plenum Press, New York, 1994.

L. Guo, Modeling of a supersonic DC plasma in CNT production, Ph.D. thesis, McGill University, 2009.

* cited by examiner

Figure 6 (Lower resolution FE-SEM image)
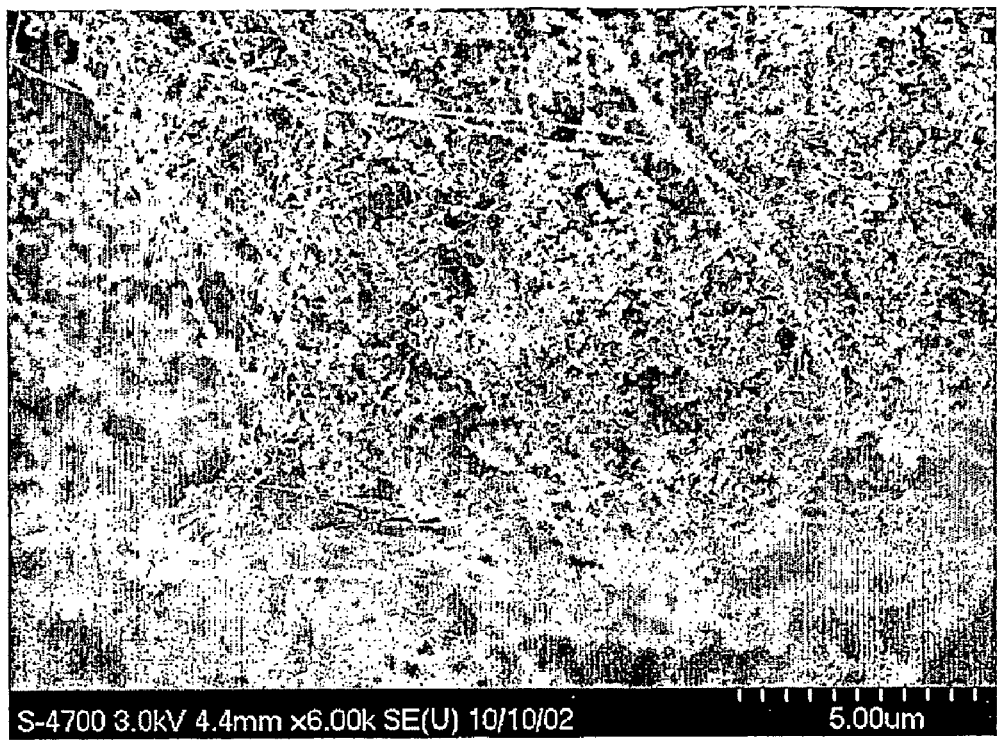
Figure 7 (Lower resolution FE-SEM image)
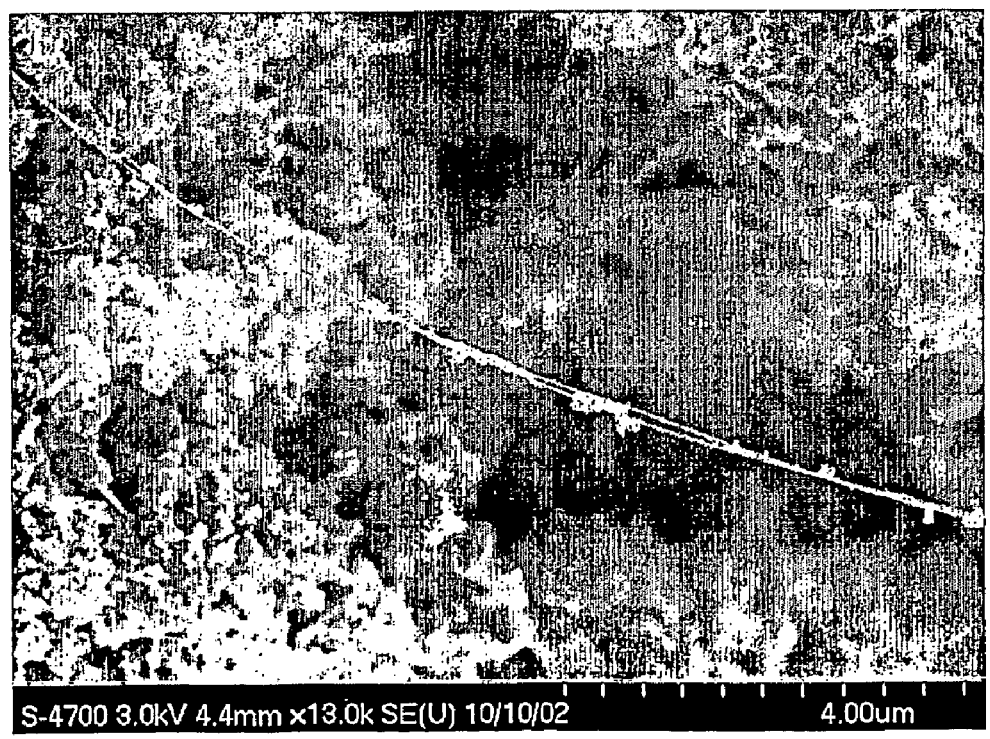

Figure 8 (Lower resolution FE-SEM image)
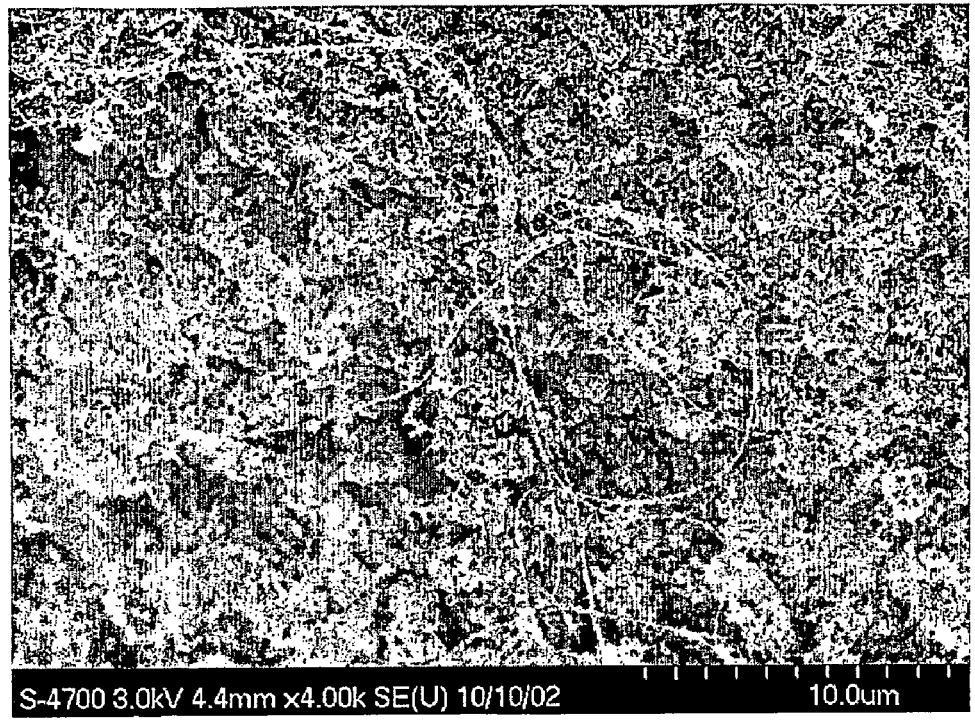
Figure 9 (Higher resolution FE-SEM image)

Figure 10 (Higher resolution Fe-SEM image)
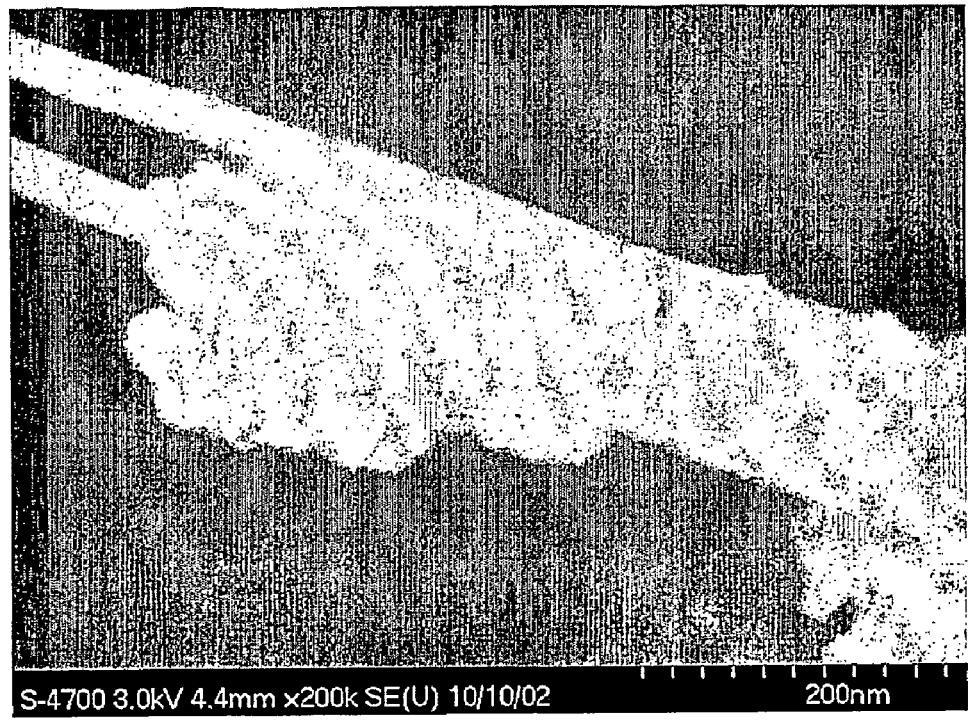
Figure 11 (Higher resolution Fe-SEM image)
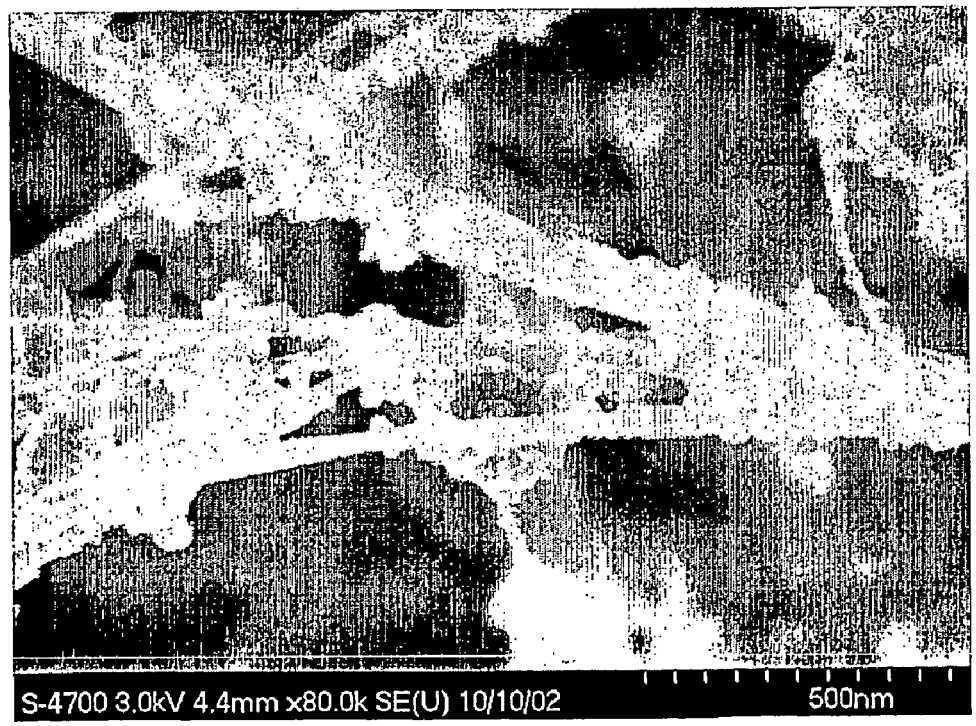

Figure 12 TEM image
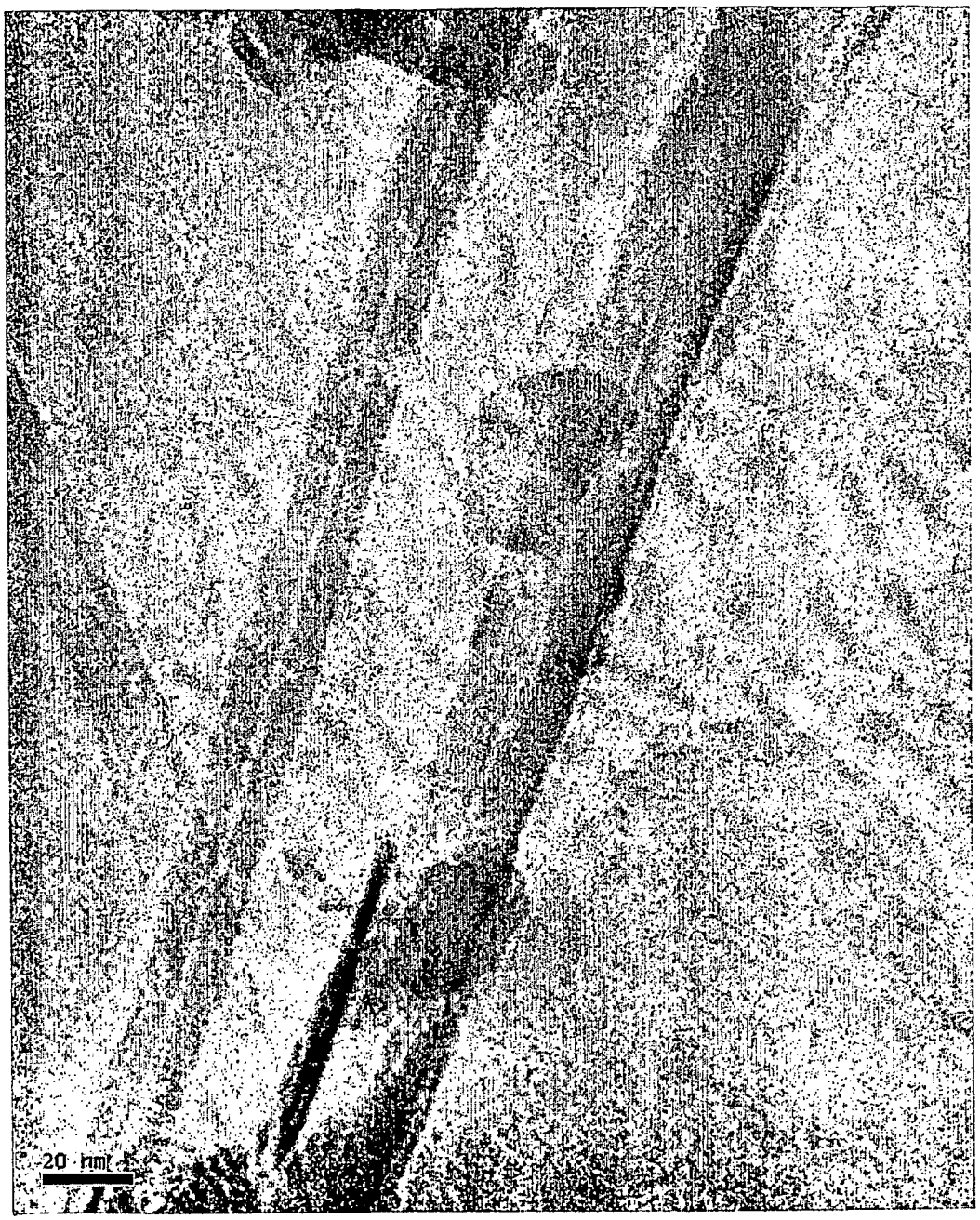

Figure 13 TEM image
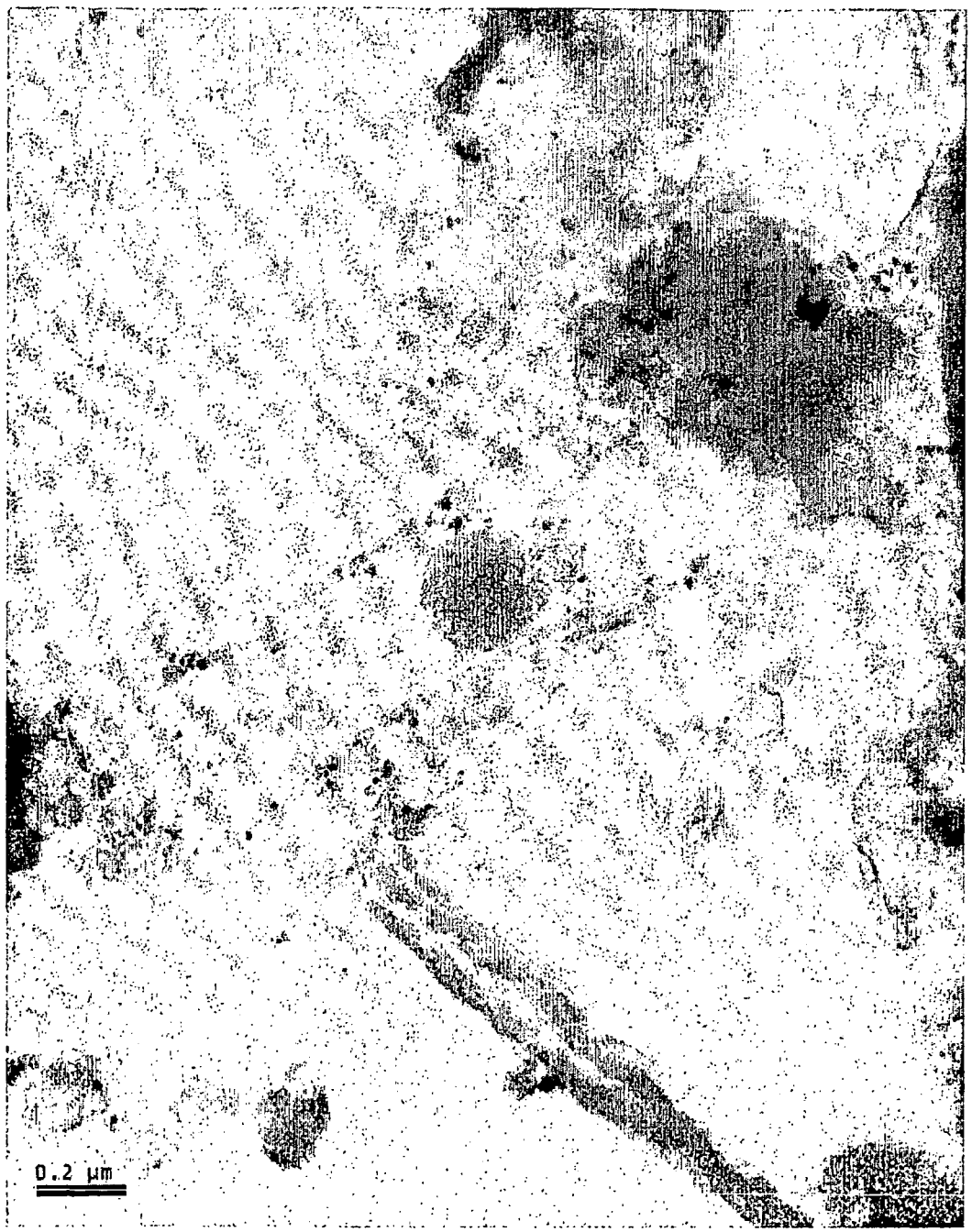

Figure 14A,B CNT observed in reactor on metal particle splashes on collecting surface.
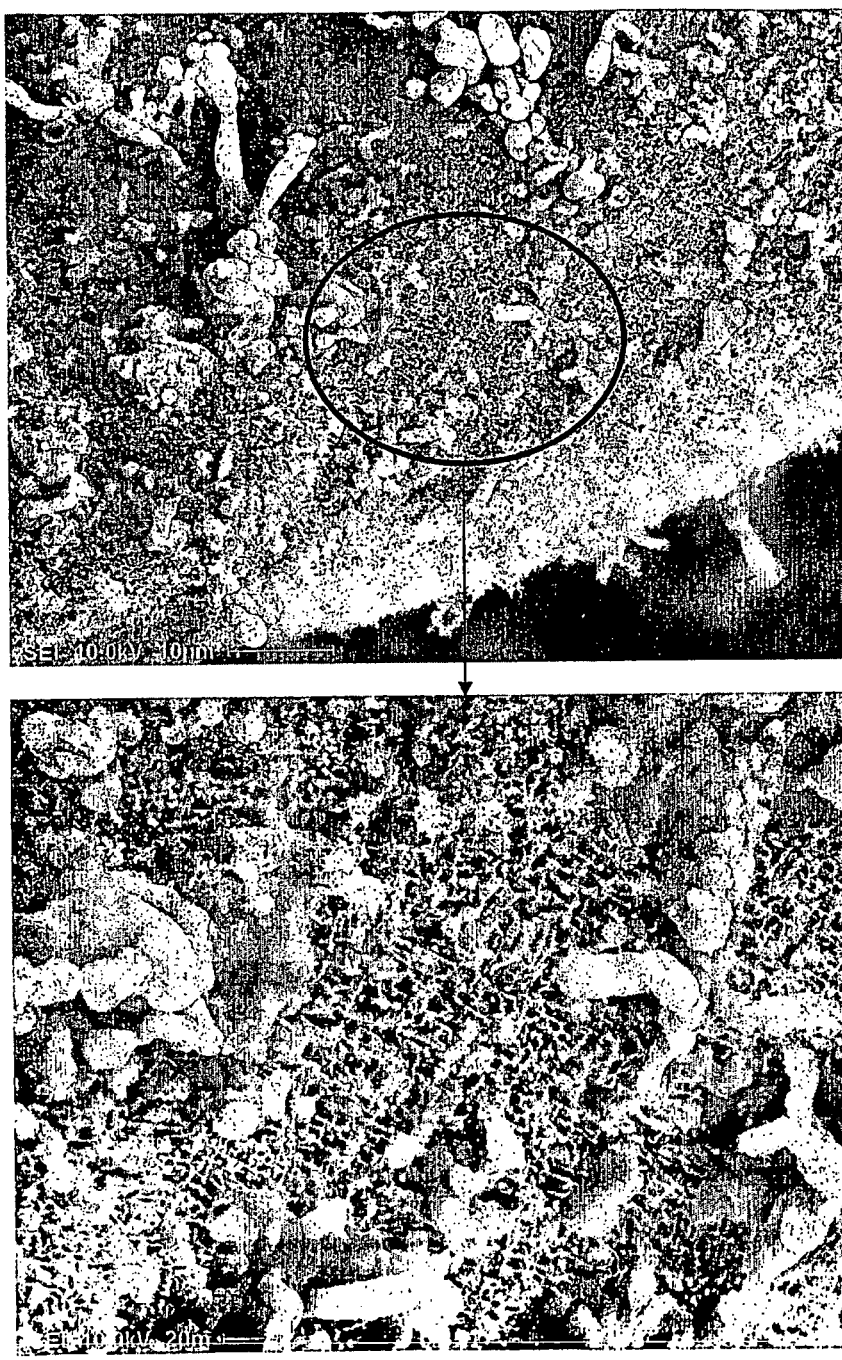

METHOD FOR PRODUCING CARBON NANOTUBES USING A DC NON-TRANSFERRED THERMAL PLASMA TORCH

CROSS-REFERENCE TO RELATED APPLICATIONS

This non-provisional patent application is a national stage entry of PCT/CA03/01779, filed Nov. 17, 2003, which claims priority to U.S. provisional application 60/426,407, filed Nov. 15, 2002.

FIELD OF THE INVENTION

This invention relates to a method for producing carbon nanostructures such as carbon nanotubes and carbon nano-onions using a thermal plasma torch which involves in situ catalyst generation of nanometer sized metal catalyst particles. The method and apparatus provides a technique for the synthesis of carbon nanotubes (CNT) and carbon nano-onions with scale up possibilities to industrial (megawatt) levels.

BACKGROUND OF THE INVENTION

State of the art techniques that are used presently for commercial production of carbon nanotubes show limitations in scale up possibility for large yields of fullerenes and CNT production, while the demand for CNT in emerging applications, for example in the field of materials is rapidly moving to the tons/month requirements.

Techniques such as the graphite arc methods that presently supply the carbon nanotube market (see U.S. Pat. Nos. 5,227,038; 5,482,601; 6,451,175 B1; 6,455,021; 6,063,243; and 5,753,088) are showing decreasing yields to nil as the arc power is increased, and poor energy efficiency. Other techniques such as laser ablation or chemical vapor deposition (CVD) techniques relate to methods that are not available at industrial scale power (Megawatt level) for providing yields above the grams/hour level.

An essential component of CNT growth is the provision of a method that provides for the nanometer sized metal catalyst particles acting as nucleation points for the tube growth. CNTs are typically formed when such nanometer size particles are present in systems generating fullerenes ($C_{60}$, $C_{70}$, and larger carbon cage structures). The catalyst prevents the closure of the carbon cage and enhances the growth of the long tubular structures. The graphite arc method typically introduces metal catalyst material within the solid graphite source with both carbon and catalyst metal being evaporated simultaneously. This results in difficult control of the carbon to metal vapor ratio, and no possibility of real time adjustments. Other methods use a long chemical route for assuring the presence of the nano-particles on surfaces on which the tubes are growing.

SUMMARY OF THE INVENTION

This disclosure relates to a process for the manufacture of carbon nanostructures, from carbon nanotubes and carbon non-onions, comprising the steps of a) providing a high enthalpy metal electrode generated direct current thermal plasma torch having a plasma forming gas feed and a cooled nozzle attached thereto, the torch being connected to a cooled reactor having a quenching zone downstream of the plasma torch for the formation of carbon nanostructures; b) selecting a catalyst metal and providing the catalyst metal to the plasma stream, selecting a torch power at a level of from about 30 kW up to a multi-megawatt level, selecting a flow rate for the plasma forming gas feed, and selecting the reactor pressure so as to provide a plasma torch stream temperature required to vaporize and maintain the selected catalyst metal in the vapor state; c) providing a feed of a carbon containing substance and a carrier gas at a selected flow rate to the plasma stream; and d) the resulting plasma stream containing carbon, carrier gas and metal vapor entering, the quenching zone of carbon nanostructure formation, wherein the plasma stream is rapidly cooled at a quenching rate which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula $T_2 = T_1 + W_p/\dot{m}C_p$, where $T_1$ is room temperature; $W_p$ is the energy input to the plasma, $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/velocity of plasma gas entering the nozzle, whereupon metal catalyst nanoparticles acting as nucleation sites and catalyst for the growth of carbon nanostructures are generated in situ, which with atomic carbon from the carbon containing substance, form such structures in a diameter range of from about 2 to about 30 nm, which carbon nanostructures are then collected. In a further aspect, the process involves the manufacture of carbon nanostructures, the carbon nanostructures being selected from carbon nanotubes and carbon nano-onions, comprising the steps of a) providing a high enthalpy metal electrode generated direct current thermal plasma torch having a plasma forming gas feed and a cooled nozzle attached thereto, the cooled nozzle having a carbon containing substance and carrier gas feed, the torch being connected to a cooled reactor having a quenching zone downstream of the plasma torch for the formation of carbon nanostructures; b) selecting a catalyst metal, selecting the torch power at a level of from about 30 kW up to a multi-megawatt level, selecting the flow rates of the plasma forming gas feed and the carbon containing substance and carrier gas feed, and selecting the reactor pressure so as to provide a plasma torch temperature required to vaporize the catalyst metal and maintain the catalyst metal in vapor form, a plasma stream expansion at the nozzle exit and the downstream quenching zone allowing cooling of the plasma stream wherein the plasma stream is rapidly cooled at a quenching rate which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula $T_2 = T_1 + W_p/\dot{m}C_p$, where $T_1$ is room temperature; $W_p$ is the energy input to the plasma, $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/ velocity of plasma gas entering the nozzle, to generate in situ nanometer sized metal catalyst particles, which act as catalyst and nucleation sites for the formation of carbon nanostructures; and c) injecting the carbon-containing substance and carrier gas into the nozzle at a feed rate that allows the formation of atomic carbon, and injecting the resulting plasma stream seeded with atomic carbon and metal vapours into the quenching zone downstream of the plasma torch which, in the presence of the nanometer sized metal catalyst particles generated in situ, form carbon nanostructures having a diameter of from about 2 to about 30 nm, which are then collected. In another aspect, the process for the manufacture of carbon nanostructures, the carbon nanostructures being selected from carbon nanotubes and carbon nano-onions, comprising the steps of a) selecting tungsten as a catalyst metal and providing a high enthalpy tungsten-coated electrode in a direct current thermal plasma torch having an inlet for a plasma forming gas feed at a flow rate of about 100 to about 225 standard liters per minute; b) selecting the torch power at a level of from about 30 to about 65 kW and the reactor pressure at about 200 to about 800 torr, so as to provide a plasma torch temperature required to vaporize the tungsten-coated metal electrode and maintain the tungsten metal in the form of a vapor; c) selecting a tungsten nozzle attached to the torch outlet and cooled to a temperature below 1500° C., the nozzle having a carbon containing substance and a carrier gas feed inlet and injecting the carbon-containing substance at a rate of about 0.15 mol/min with a carrier gas at a flow rate of about 20 standard liters per minute into the plasma stream from the nozzle inlet; and d) using the cooling of the plasma stream produced by the carbon-containing substance and carrier gas feed, and by a supersonic shock created at an exit of the nozzle or the provision of an expansion in the nozzle internal diameter, wherein the plasma stream is rapidly cooled at a quenching rate which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula, $T_2 = T_1 + W_p/\dot{m}C_p$, where $T_1$ is room temperature; $W_p$ is the energy input to the plasma, $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/velocity of plasma gas entering the nozzle, to generate in situ nanometer sized tungsten catalyst particles, which act as the catalyst and nucleation sites for the formation of carbon nanostructures having a diameter of from about 2 to about 30 nm within the plasma stream, which are then collected.

In determining a suitable apparatus for carrying out the process of the invention, it is thought that the geometric configuration of the nozzle can be optimized by computational fluid dynamic (CFD) modeling of the temperature/flow patterns in the nozzle. Commercially, it is desirable to maximize nucleation beyond the nozzle. The present invention relates to the process described in U.S. Pat. No. 5,395,496 (Process for the synthesis of fullerenes; P. G. Tsantrizos, S. Grenier) but is directed towards CNT synthesis. The present invention can also be used for the synthesis of carbon nano-onions. The process of the invention makes use of U.S. Pat. No. 5,147,998 (High enthalpy plasma torch; P. G. Tsantrizos et al) for the plasma and catalyst nano-particles generation device.

A feature of the present process is in the generation of the nanometer sized particles of catalyst. The present process uses the intrinsic vaporization of a properly chosen electrode material within the plasma torch to generate metal vapor that nucleates into nano-particles in a zone of nanotube formation. Hence the amount of catalyst nano-particles and of carbon precursor for CNT growth are controlled independently and without the requirement for an external feed system for the metal catalyst. The metal vapor content in the plasma is controlled by the electric arc current in the plasma torch, and the quantity of carbon in the system is controlled by the carbon source gas volumetric flow.

The method of this invention is based on DC plasma torch technology currently available and used for chemical synthesis and materials treatment at the multi-Megawatt power level. A carbon-containing gas is used as the source material for CNT generation. This gas is dissociated in the plasma environment to provide the atomic carbon for CNT growth. This is much more economical from the energy perspective than the solid carbon sublimation used in graphite arc and laser methods, and also adds to the scale up potential through the volumetric increase of gas treated at large power. An increase in process power translates into an increased amount of the carbon feed gas that is treated and transformed into CNT per unit time.

Other alternate methods for producing the catalyst can be used in this process, for example the injection of metal powders in the outlet flame of the torch or melted droplets of metal from metal samples brought in contact with the flame. This last method has shown carbon fibers growing on the droplets collected on a wall facing the plasma torch. Alternatively, the catalyst nanoparticles can be transported into the liquid carbon precursor, such as tetrachloroethylene (TCE), before injection either in a high power DC plasma torch, or in the injection probe of an inductively coupled thermal plasma torch (TP-ICP) system.

The method of the invention is not limited to these plasma and catalyst generation methods. Other systems may, for example, use a separate metal evaporator for the metal nanoparticle production, such as the systems based on transferred arc technology, which can replace the electrode erosion based nanoparticle generation. Transferred arc technology is similar to a DC torch technology, with the exception that the electric arc is "transferred" to an electrode (the anode) outside of the torch itself (see J. Feinman, editor, *Plasma Technology in Metallurgical Processing*, Iron & Steel Society (1987) at Chapter 7; J. R. Roth, *Industrial Plasma Engineering*, Vol. 1, *Principles*, Institute of Physics Publishing (1995) at page 382). This outside anode is typically made of the material to be treated, for example a metal, and is melted and vaporized due to the heating power of the arc. The metal vapors are transported to a reaction chamber for producing nanoparticles.

With an inductively coupled thermal plasma torch (TP-ICP) system, a radio frequency power in the megahertz range is fed to a coil surrounding a ceramic confinement tube containing a gas. Magnetic induction at a high frequency is used in a TP-ICP to couple the power to the plasma, and no electrodes are in contact with the plasma itself (see J. Feinman, editor, *Plasma Technology in Metallurgical Processing*, Iron & Steel Society (1987) at Chapter 7; J. R. Roth, *Industrial Plasma Engineering*, Vol. 1, *Principles*, Institute of Physics Publishing (1995) at page 382; M. I. Boulos, P. Fauchais, E. Pfender, Thermal Plasmas Fundamental and Applications, Vol. 1, Plenum Press (1994), Section 1.2.2.). Inductively coupled thermal plasma torch (TP-ICP) devices can replace the DC torch technology, as both systems provide the thermal plasma flame characteristic for CNT synthesis. The carbon precursor (e.g. TCE) in TP-ICP systems can be injected directly in the TP-ICP torch in the liquid form through a probe without the need for prior vaporization of the carbon precursor (e.g. TCE). In such a case the metal catalyst nanoparticles can be added and transported by the liquid carbon precursor and injected simultaneously in the torch plasma.

The disclosures of all patents mentioned in this description are incorporated herein by reference.

DETAILED DESCRIPTION OF THE INVENTION

BRIEF DESCRIPTION OF THE DRAWINGS

The accompanying drawings are used for purposes of illustrating the invention only and should not be used to construe the claims in a limiting fashion.

FIGS. 6 to 13 are electron microscopy images taken of CNT product obtained by operation of the method of the invention in Helium at 200 Torr pressure;

FIGS. 14A-C are electron microscopy images taken of product obtained by operation of the method of the invention in helium at 500 torr pressure at various magnifications.

APPARATUS FOR USE IN THE PROCESS OF THE INVENTION

The following exemplifies the type of apparatus which may be employed to conduct the method of the invention.

Figure 1:
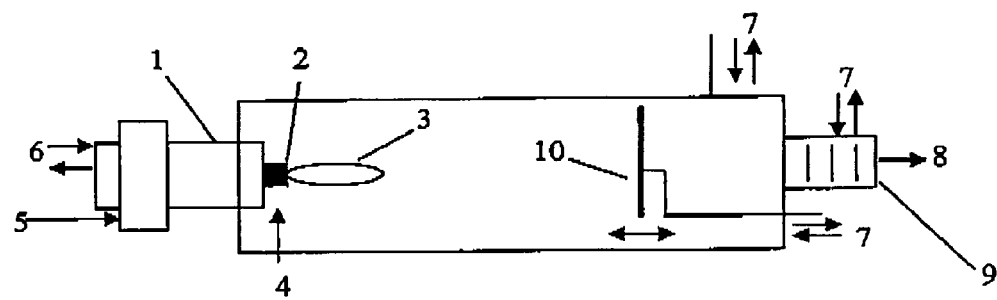
FIG. 1 is a schematic illustration of a high enthalpy plasma torch to which is attached a water-cooled nozzle for injection of a carbon-containing gas feed.
Figure 2:
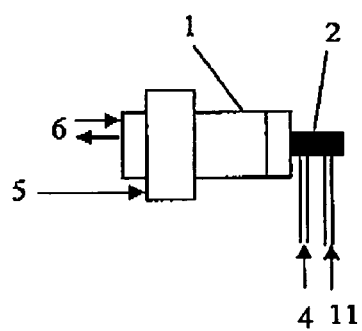
FIG. 2 is a schematic illustration of a plasma torch wherein a nozzle is shown that includes separate injection lines for carbon-containing gas and a carrier gas and for catalyst particles and a carrier gas.
Figure 3A:
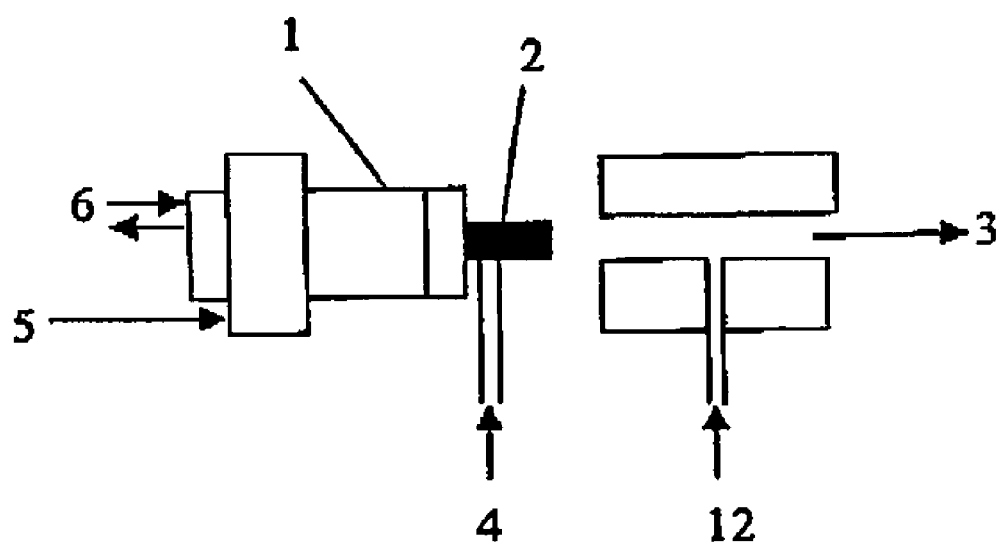
FIG. 3A is a schematic illustration of a portion of a plasma torch and a nozzle which provides for metal catalyst injection downstream of the plasma torch nozzle assembly.
Figure 3B:
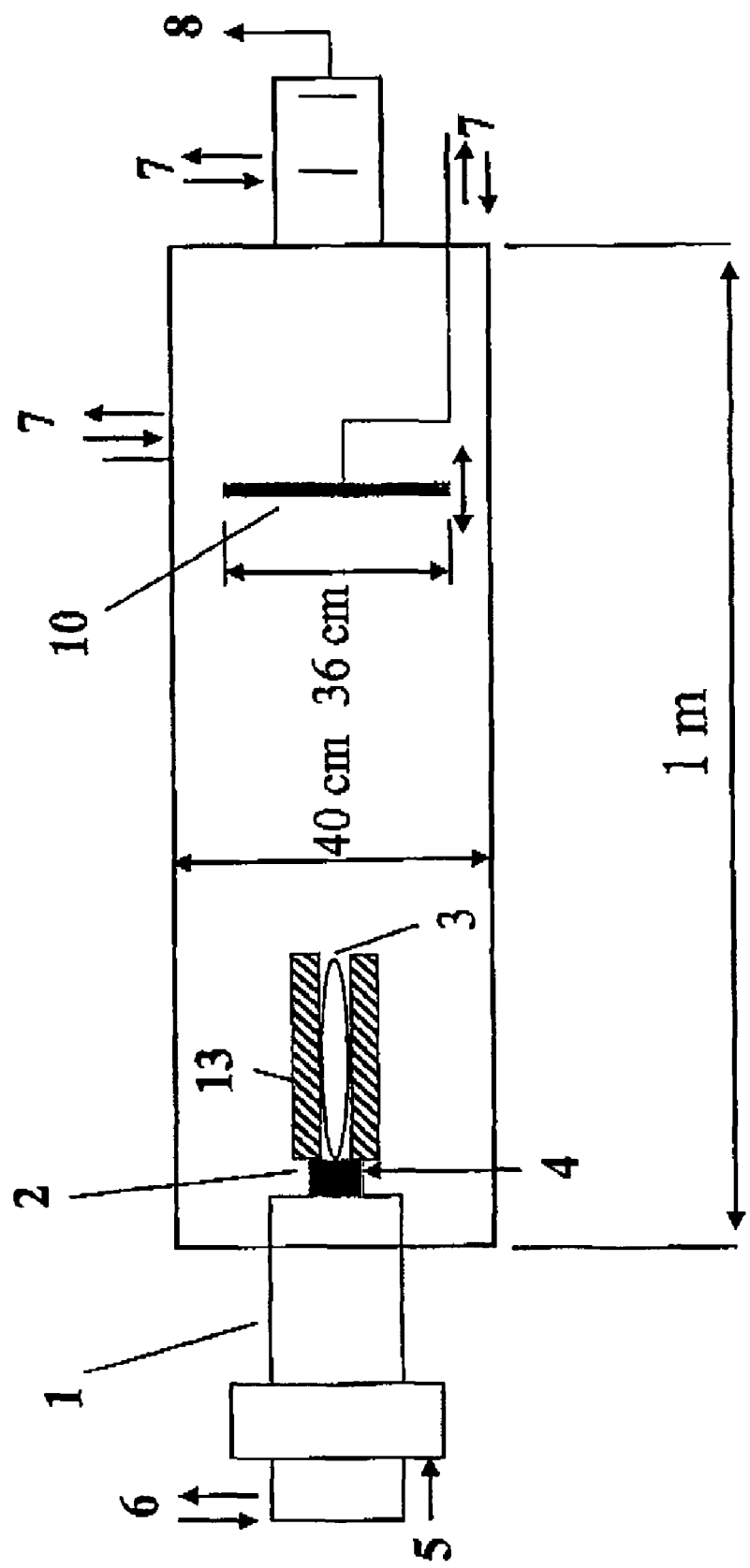
FIG. 3B is a schematic illustration of a high enthalpy plasma torch to which is attached a water-cooled nozzle for injection of a carbon-containing gas feed and wherein a hollow graphite cylinder is provided within the reactor.
Figure 4:
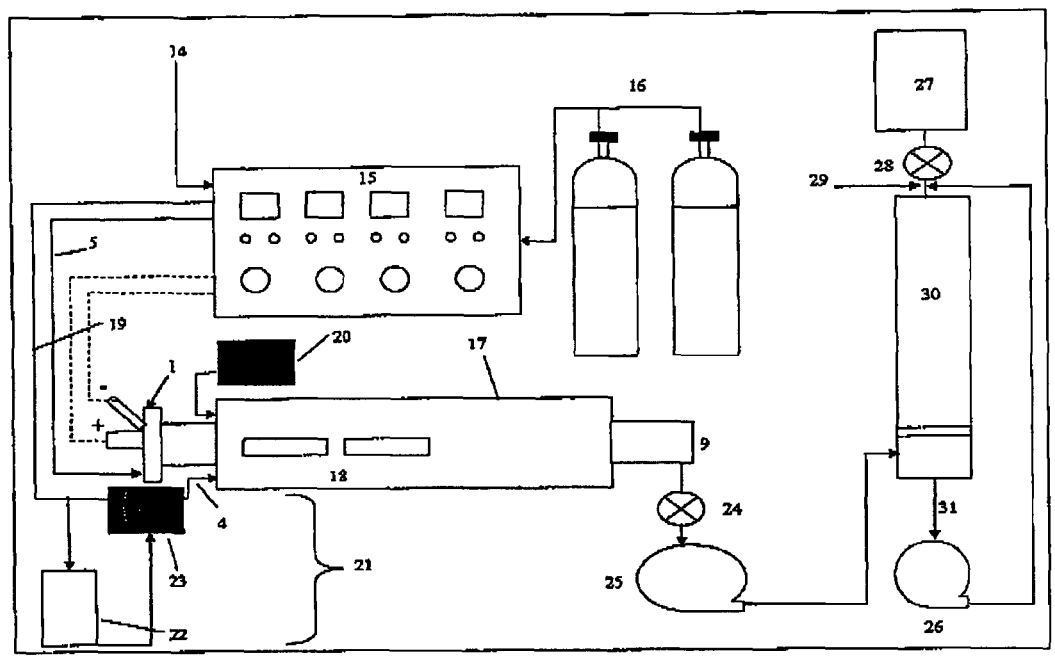
FIG. 4 is a schematic illustration of a plasma torch attached to a synthesis reactor with water-cooled walls and an off-gas cooling system.

A high enthalpy plasma torch an example of which is found in U.S. Pat. No. 5,147,998 can be used to generate the plasma. At the torch 1 outlet is attached a water-cooled nozzle 2 (see FIG. 1) for the injection of the carbon-containing gas feed 4. Experiments were carried out using tetrachloroethylene (TCE, $C_2Cl_4$) as the carbon source. The invention however is not limited to this gas as other mixtures of hydrocarbon have been shown to yield the fullerene precursor molecules. For example, see U.S. Pat. Nos. 5,395,496; 5,985,232; 6,162,411; 6,083,469; 6,099,696; 6,350,488 B1; 6,261,532 B1; 6,303,094 B1; 6,221,330 B1; 6,331,209 B1; and 6,333,016 B1 for examples of other gases and mixtures thereof. Thus various carbon halides can be used, as can various hydrocarbons. Typically, the carbon-containing gas may be characterized generally as a $C_1$-$C_6$ compound having as hetero atoms H, O, N, S or Cl, optionally mixed with hydrogen and mixtures thereof. The carbon-containing gas was carried to the nozzle and injected using a transporting gas such as helium or argon. The transporting gas is typically referred to as the carrier gas. Experiments described herein for CNT growth were made both with helium and argon gas. CNT production with argon (see FIG. 17) has an important advantage of lower cost of operation. Typically, but not necessarily, the transporting gas is the same type as that used as the main plasma forming gas 5 inside the plasma torch. The method described above and illustrated schematically in FIG. 1 is based on the method described in U.S. Pat. No. 5,395,496 for fullerene production. The electrode material in contact with the electric arc inside the plasma torch constitutes, through the arc erosion process, the source of material for the production of nano-particles of catalyst. The torch design used in the tests is based on U.S. Pat. No. 5,147,998 with tungsten as the electrode surface material. Alternatively, fine metal particles can be injected along with the carbon in the carrier gas or by using a separate injection line 11 in the nozzle as shown in FIG. 2. Alternatively, metal catalyst injection 12 can also be made downstream of the plasma torch-nozzle assembly using powders or metal samples melted and vaporized by the strong heat flux of the plasma flame as shown in FIG. 3A. Alternatively, metal catalyst nanoparticles can be added in the liquid carbon precursor and injected either downstream of the plasma torch. Alternatively, metal catalyst nanoparticles added in the liquid carbon precursor can be injected directly in the plasma when using an injection probe inserted in an inductively coupled thermal plasma torch (TP-ICP) instead of a DC plasma torch. The plasma torch may be attached to a synthesis reactor 17 with water-cooled walls 7 and an off gas cooling system 8 as illustrated in FIGS. 1 and 4. The pressure in the reactor can be controlled between 200 Torr and 800 Torr. Peripherals may be attached to the reactor and may be selected from units for off gas cleaning, pumping, cooling, control and electrical power supply for the plasma torch. Inside the reactor is a provision for product recovery on a water-cooled plate 10 facing the plasma torch at some adjustable position. Provisions to control the temperature profile and residence time in some given temperature zone can be added in the main chamber through the use of an inner enclosure surrounding the plasma jet. A hollow graphite cylinder 30 cm long is used as the inner enclosure in the present embodiment of the invention (see FIG. 3B).

Figure 5:
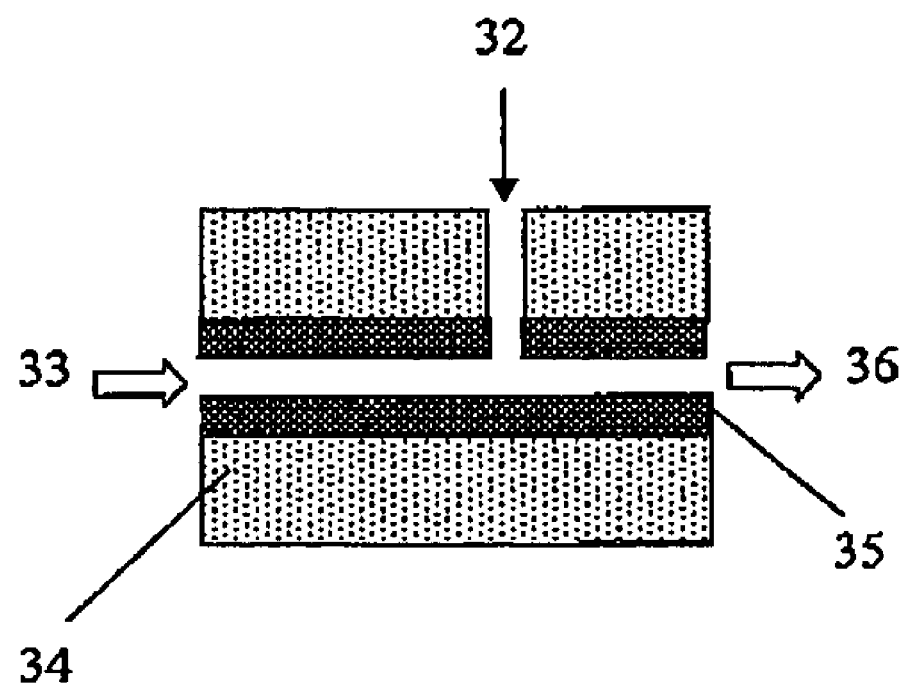
FIG. 5 is a schematic illustration of the nozzle walls shown in FIGS. 1 to 4 with carbon nanotubes depicted thereon.

In the experiments described herein, tungsten electrodes were used to generate the nano-particles of catalyst. The very high boiling point of tungsten (5660° C.) results in the metal particles being generated directly within the nozzle, and as the nearby area of the nozzle wall has a temperature typically in the range of 1000-1500° C., the resulting fast quench of the metal vapor induces nanometer size particle nucleation. In such a scenario, an significant amount of long CNT structures 35 are produced directly on the nozzle walls as seen in FIG. 5, as this region corresponds to a good catalyst particle nucleation zone from the strong thermal gradients occurring close to the nozzle 34 wall. Also, the nucleation of catalyst particles from the thermal gradients generated by the cold TCE injection (compared to the hot plasma) also occurs in the main stream. These particles exit the plasma torch 36 and enter the main reactor chamber for CNT growth in the gas phase. A change in electrode material to a metal with a lower boiling point, and/or a change in surface temperature of the nozzle, and/or a change of the nozzle geometry inducing a given flow pattern and quenching rate, and/or a change in the position of the carbon-containing gas acting as a quench, and/or the insertion of a quenching surface within the plasma torch tailflame, and/or alternate source of catalyst as illustrated in FIGS. 2 and 3A, all result in modifying and controlling the position of CNT formations. Thus the CNT formed may be single-walled, multi-walled (depending mainly on the size of metal particles), and the lengths of the tubes may be affected by any of these changes.

Figure 16:
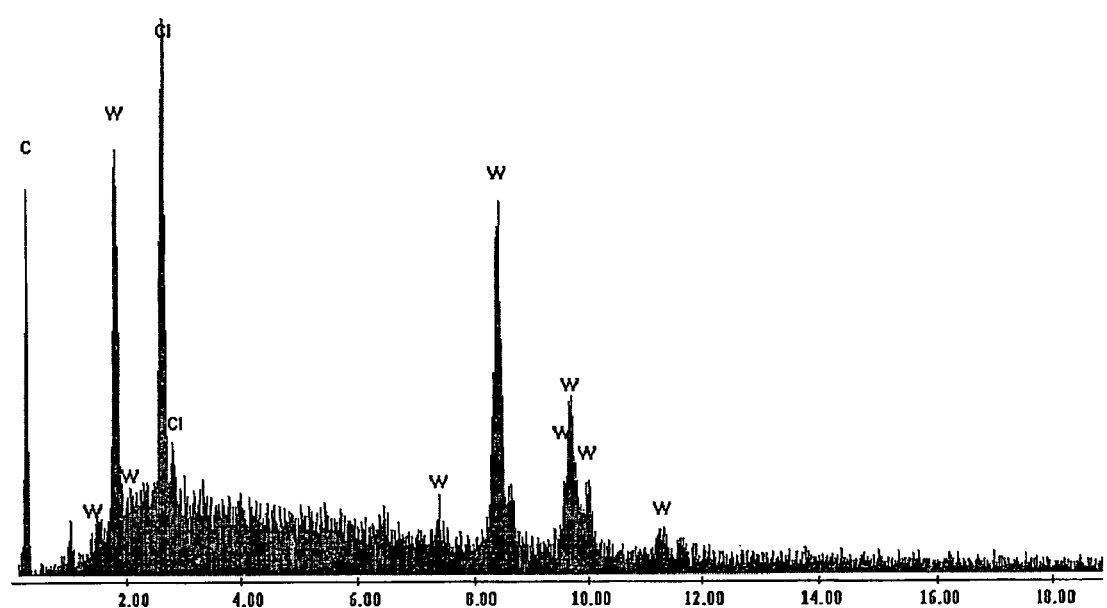
FIG. 16 gives the element analysis spectra obtained on the black particles visible in FIG. 13.
Figure 17:
FIG. 17 is an electron microscope image talcen of CNT product obtained by operation of the method of the invention in Argon at 200 Torr pressure.

FIGS. 6 to 13, and 16, show electron microscopy images of the CNT formed within the nozzle. FIGS. 6, 7, 8 are lower magnification scanning electron microscope (SEM) images showing that very long fibers are produced with lengths up to 50 μm, and the presence of fibers throughout and strongly imbedded within the carbon soot particles. FIGS. 9, 10, 11 are higher magnification SEM images of these fibers, revealing a typical tube diameter from 10 to 30 nm, and a good uniformity of the tubes over their lengths. FIGS. 12 and 13 are transmission electron microscope (TEM) images showing that nano-fibers are effectively nanotubes with inside diameters around 2 nm. FIG. 13 also shows the catalyst particles (black dots) of tungsten located at the tip of the tube and responsible for the tube growth. FIG. 16 presents the results of an energy dispersive X-ray analysis (EDAX) of the black particles visible in FIG. 13, showing the tungsten peaks. FIG. 17 shows similar CNTs produced using Argon instead of Helium as the plasma and carrier gas.

Figure 14C:
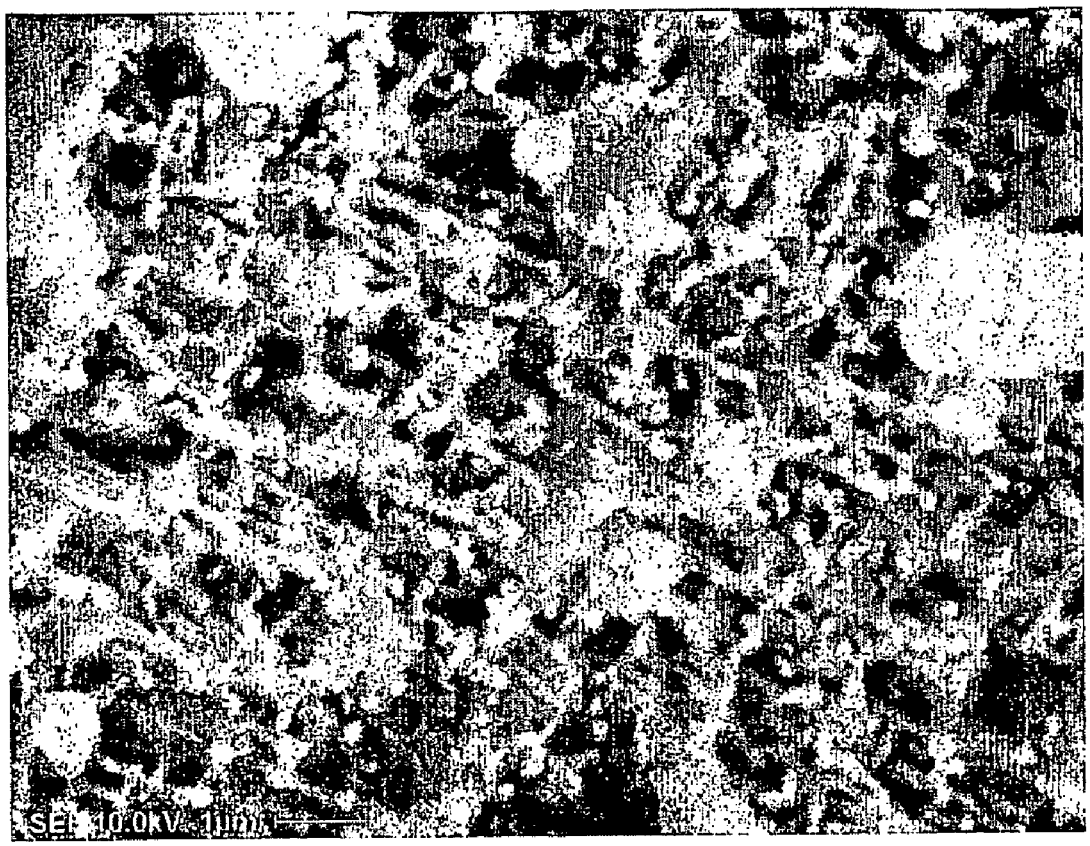

One important aspect of the present application is the ability of the method to generate the nanometer sized metal particles. FIG. 14 shows other images of tubes formed outside the torch-nozzle assembly and collected on a water-cooled plate. In FIG. 14, the metal sample vaporization technique of FIG. 3 was used with iron wires inserted into graphite holders at the outlet of the torch.

Demonstration of CNT generation using the present method was made at the 55 kW power level.

Figure 15:
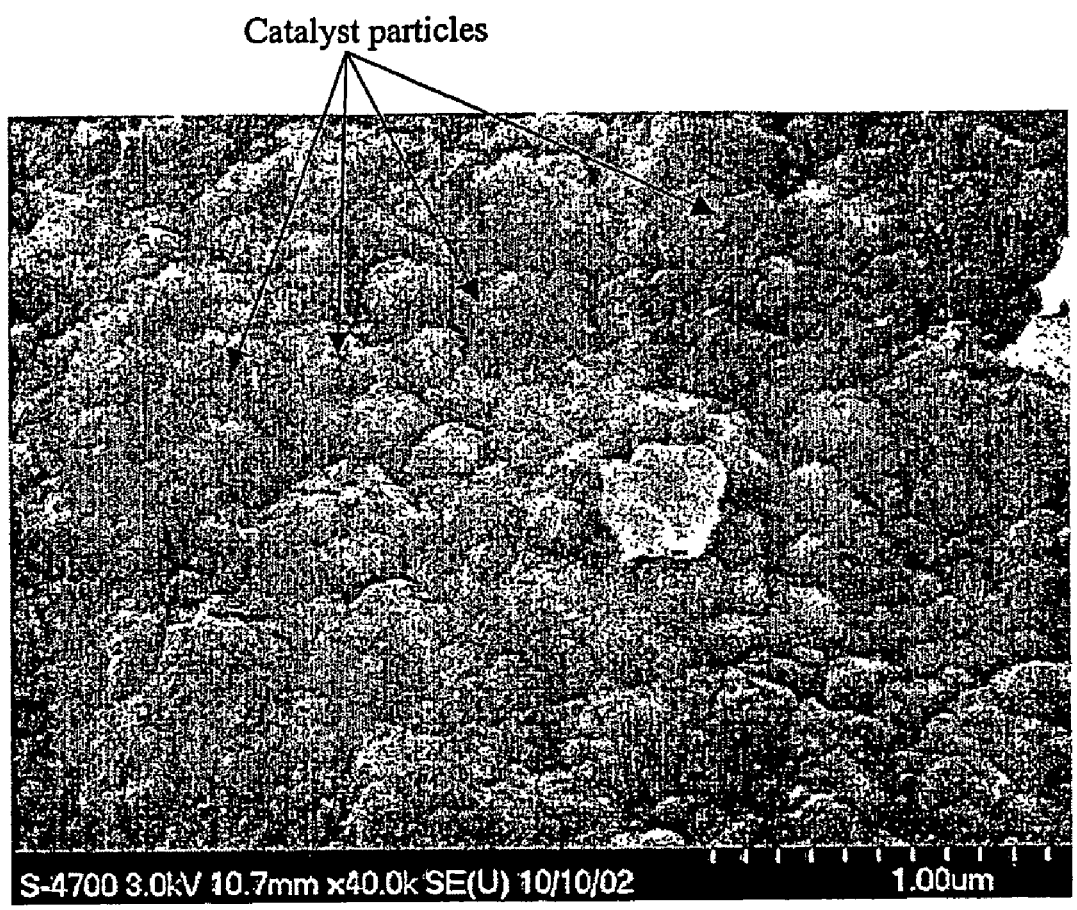
FIG. 15 is an electron microscope image showing well dispersed small catalyst particles in the soot.

FIG. 15 shows an additional SEM of well dispersed small catalyst particles in the soot. Good dispersion and homogeneity of the nano-particles is a difficult task considering strong agglomeration effects encountered at this scale length. The present method solves this problem through in situ generation of the catalyst, this occurring within the plasma at the site of tube growth.

Detailed Description of the Method of the Invention

The present invention can involve the use of a plasma torch 1 as described in U.S. Pat. No. 5,147,998 on which a water-cooled nozzle assembly is added for carbon-containing gas injection. Typically, the material for the nozzle is tungsten when using tetrachloroethylene (TCE) as a carbon source gas. The electrodes used in the demonstration experiment were coated with tungsten, although electrode surfaces containing either Fe, Ni, Co, Cr, Mo, Pd, Pt, Ru, Rh, Hf and Gd should also show significant catalytic effects.

Using TCE as a carbon source gas, an evaporator 23 is used to transform the liquid TCE 22 (at room temperature) to a gas carried in heated lines at 200° C. with a helium or argon flow 19. Flowrates used are typically 20 standard liters per minute (slpm) of helium and 0.05 to 0.54 mol/min TCE. Higher power DC plasma torches or inductively coupled thermal plasma torches (TP-ICP) can provide the flexibility to inject the liquid TCE directly into the torch. In such cases, nano-particles of catalyst can also be incorporated into the liquid feed and simultaneously injected into the plasma.

The plasma torch 1, nozzle 2 and carbon/carrier gas 4 feed lines are assembled to a reactor chamber 17 made of stainless-steel with water cooling 7 using a double wall system. Provision is made for access inside the chamber for product recovery on the walls and/or on a collecting plate/receptacle. For continuous operation, further provision should be made for product removal during plasma torch operation. The reactor chamber is to be operated at pressures between 200 and 800 Torr He. Experiments the results of which are shown in FIGS. 6 to 13 were made at 200 Torr He, while the experiments for which the results are shown in FIG. 14 were made at 500 Torr He, and those for FIG. 17 were made at 200 Torr Argon. Provision is made for pumping of the off gases 8 using a water ring vacuum pump 25 in the scheme using TCE as the carbon source gas. Provision is also made at the reactor outlet for off gas cooling 9 before its transport to the vacuum pump. Using the scheme of TCE carbon source, a chlorine separation/recovery system 27, 28, 29, 30, 31 and 26 is used at the outlet of the vacuum pump.

Helium or argon gas is supplied to the main plasma torch 5 gas inlet at a volumetric rate of typically 200 to 225 slpm. This rate is very much dependent on the plasma torch employed. In the experiments described herein, a plasma torch sold by PyroGenesis Inc. model RPT-2, 100 kW high enthalpy plasma torch was used. The use of other torches would dictate the rate. Plasma torch operation also requires water cooling lines and electrical power line connections 6. Typically, TP-ICP plasma torch systems require much lower flowrates.

A summary of the experimental conditions used for the production of the carbon nanotubes described in the present application is provided in the following Table I.

TABLE I

Experimental conditions for nanotube production in the present study.

| Conditions | Plasma-Forming Gas | |
| --- | --- | --- |
| | Helium | Argon |
| Torch Power (kW) | 30 to 65 | 30 |
| Main plasma gas flow rate (slpm) | 225 | 100 |
| $C_2Cl_4$ feed rate (mol/min) | 0.15 | 0.15 |
| Carrier Gas flow rate (slpm) | 20 | 20 |
| Reactor Pressure (torr) | 200, 500 | 200 |
| Reactor Length (cm) | 100 | 100 |
| Run Duration (min) | 5 | 5 |

At startup, the TCE injection system is brought up to its optimal temperature. Water cooling systems are then actuated as well as off gas cleaning systems. These comprise conventional equipment known in the art. The reactor is then evacuated to the desired pressure and a torch preheat is made in the first minute using argon or helium plasma gas and the carrier gas. This provides the high nozzle temperature for TCE injection and prevents a condensation of the TCE in the inlet lines.

The type and flow rate of plasma gas can then be adjusted to the desired values. TCE flow is admitted to the evaporator 23 and injected into the torch nozzle 2 at a desired flow rate. Adjusting the electric current supplied to the plasma torch sets the quantity of metal vapor in the main plasma stream. Tests were made with arc current at 350 A.

CNTs are produced and collected in the nozzle wall, and/or on the walls of the chamber or on collecting surfaces that may be located along the plasma jet at the outlet of the nozzle.

Generally, the current, voltage and flow rates are all interdependent parameters which depend on the plasma torch, use of metal electrode or metal particles to generate the catalyst and the plasma gas.

Preliminary demonstration experiments were made with a tungsten nozzle geometry that allows for an expansion of the plasma jet in order to provide a rapid cooling of the metal vapour at a position corresponding to TCE injection. Computational fluid dynamic (CFD) modeling of the temperature/flow patterns in the nozzle provided the basic knowledge for nozzle geometries enabling nucleation of the nano-particles of metal. Experiments with the expansion nozzle resulted in rapid production of tungsten nanoparticles inside the nozzle itself, solid tungsten nucleation occurring at the very high temperatures attained in this zone into the system. Long CNT (mainly multi-wall nanotubes—MWNT) of over 50 micrometers in length and typically 30 nanometer in external diameter were produced from the tungsten nano-particles directly inside the nozzle expansion zone. These nanotubes were grown both in argon and helium, and were found in high concentration inside a soot adhering strongly to the nozzle walls. Experiments with increasing reactor pressure were aimed at pushing the nanotube formation outside the nozzle area into the reactor. Similarly, experiments with iron catalyst wires held and vaporized by the plasma jet outside of the reactor also allowed for CNT formation on the iron droplets projected onto the water cooled surface facing the plasma torch. This showed that providing catalyst nano-particles within the plasma jet outside of the plasma torch in a zone where atomic carbon is present enables the possibility of growing the CNT in the gas phase. Reactor optimization may be achieved through the selection of a metal electrode catalyst (for example Fe or Ni/Co) that will nucleate nano-particles downstream of the nozzle (i.e. outside the nozzle), and further inject these particles in a controlled temperature and flow velocity zone optimizing the nanotube formation and elimination of the by-products such the chlorinated compounds (mainly $C_2Cl_4$). Various nozzle geometries can be used to attain the necessary cooling rates of the metal vapours. Also, an inner wall made of a hollow cylinder of graphite is added inside the main reactor to better control the temperature and flow pattern in order to attain uniform temperature (typically around 1000° C.) and long residence times. A fast cooling of the plasma jet at the nozzle exit contributes to achieving nucleation of the metal vapour into nanometer-sized particles having a narrow size distribution.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

The invention claimed is:

1. A process for the manufacture of carbon nanostructures, the carbon nanostructures being selected from carbon nanotubes and carbon nano-onions, comprising the steps of
   a) providing a high enthalpy metal electrode generated direct current thermal plasma torch having a plasma forming gas feed and a cooled nozzle attached thereto, the torch being connected to a cooled reactor having a quenching zone downstream of the plasma torch for the formation of carbon nanostructures;
   b) selecting a catalyst metal and providing the catalyst metal to the plasma stream, selecting a torch power at a level of from about 30 kW up to a multi-megawatt level, selecting a flow rate for the plasma forming gas feed, and selecting the reactor pressure so as to provide a plasma torch stream temperature required to vaporize and maintain the selected catalyst metal in the vapor state;
   c) providing a feed of a carbon containing substance and a carrier gas at a selected flow rate to the plasma stream, and
   d) the resulting plasma stream containing carbon, carrier gas and metal vapor entering the quenching zone of carbon nanostructure formation, wherein the plasma stream is rapidly cooled at a quenching rate of about $10^{7}$° C./s which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula $T_2=T_1+W_p/\dot{m}C_p$, where $T_1$ is room temperature; $W_p$ is the energy input to the plasma; $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/velocity of plasma gas entering the nozzle, whereupon metal catalyst nanoparticles acting as nucleation sites and catalyst for the growth of carbon nanostructures are generated in situ from the metal catalyst vapor, which, with atomic carbon from the carbon containing substance, form such structures in a diameter range of from about 2 to about 30 nm, which carbon nanostructures are then collected.

2. A process as claimed in claim 1 wherein the carrier gas and the plasma forming gas are each selected from helium, argon, nitrogen and air, and they are the same or different 3. A process as claimed in claim 1 wherein the carbon-containing gas substance is tetrachloroethylene.

4. A process as claimed in claim 1 wherein the catalyst metal is selected from iron, tungsten, nickel, cobalt, chromium, molybdenum, palladium, platinum, ruthenium, rhodium, hafnium, gadolinium, and combinations thereof in the form of an electrode coated with one or more of such catalyst metals, in the form of powders of one or more of such catalyst metals and particles of one or more of such catalyst metals.

5. A process as claimed in claim 4 wherein a tungsten electrode is used.

6. A process as claimed in claim 5 wherein a tungsten nozzle is used.

7. A process as claimed in claim 4, wherein the electrode is a copper electrode coated with one or more of such catalyst metals.

8. A process as claimed in claim 1 wherein the amount of catalyst nanoparticles and of carbon-containing substance are controlled independently.

9. A process as claimed in claim 8 wherein the metal vapor content in the plasma stream is controlled by the electric arc current in the plasma torch and the quantity of carbon in the system is controlled by the carbon source gas volumetric flow.

10. A process as claimed in claim 1 wherein the catalyst is derived from at least one metal powder injected into the outlet stream of the torch.

11. A process as claimed in claim 1 wherein the catalyst is generated from droplets of metal generated from a metal sample brought into contact with the stream.

12. A process as claimed in claim 1 wherein the carbon-containing substance is selected from at least one of liquid hydrocarbons vaporized before injection, liquid hydrocarbons vaporized by the thermal plasma after injection in the high enthalpy thermal plasma torch, and gaseous hydrocarbons.

13. A process for the manufacture of carbon nanostructures, the carbon nanostructures being selected from carbon nanotubes and carbon nano-onions, comprising the steps of
   a) providing a high enthalpy metal electrode generated direct current thermal plasma torch having a plasma forming gas feed and a cooled nozzle attached thereto, the cooled nozzle having a carbon containing substance and carrier gas feed, the torch being connected to a cooled reactor having a quenching zone downstream of the plasma torch for the formation of carbon nanostructures;

b) selecting a catalyst metal and providing the catalyst metal to the plasma forming gas feed, selecting the torch power at a level of from about 30 kW up to a multi-megawatt level, selecting the flow rates of the plasma forming gas feed and the carbon containing substance and carrier gas feed, and selecting the reactor pressure so as to provide a plasma torch temperature required to vaporize the catalyst metal and maintain the catalyst metal in vapor form, the plasma stream expansion at the nozzle exit and the downstream quenching zone allowing cooling of the plasma stream to generate in situ nanometer sized metal catalyst particles, which act as catalyst and nucleation sites for the formation of carbon nanostructures; and c) injecting the carbon-containing substance and carrier gas into the nozzle at a feed rate that allows the formation of atomic carbon, and injecting the resulting plasma stream seeded with atomic carbon and metal vapors into the quenching zone downstream of the plasma torch, wherein the plasma stream is rapidly cooled at a quenching rate of about $10^{7}$° C./s which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula $T_2=T_1+W_p/\dot{m}C_p$, where $T_1$ is room temperature; $W_p$ is the energy input to the plasma, $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/velocity of plasma gas entering the nozzle, which in the presence of the nanometer sized metal catalyst particles generated, form carbon nanostructures having a diameter of from about 2 to about 30 nm, which are then collected.

14. A process for the manufacture of carbon nanostructures, the carbon nanostructures being selected from carbon nanotubes and carbon nano-onions, comprising the steps of a) selecting tungsten as a catalyst metal and providing a high enthalpy tungsten-coated electrode in a direct current thermal plasma torch having an inlet for a plasma forming gas feed at a flow rate of about 100 to about 225 standard liters per minute;

b) selecting the torch power at a level of from about 30 to about 65 kW and the reactor pressure at about 200 to about 800 torr, so as to provide a plasma torch temperature required to vaporize the tungsten-coated metal electrode and maintain the tungsten metal in the form of a vapor;

c) selecting a tungsten nozzle attached to the torch outlet and cooled to a temperature below 1500° C., the nozzle having a carbon containing substance and a carrier gas feed inlet and injecting the carbon-containing substance at a rate of about 0.15 mol/min with a carrier gas at a flow rate of about 20 standard liters per minute into the plasma stream from the nozzle inlet; and d) using cooling of the plasma stream produced by the carbon-containing substance and carrier gas feed, and by a supersonic shock created at the exit of the nozzle or the provision of an expansion in the nozzle internal diameter, wherein the plasma stream is rapidly cooled at a quenching rate of about $10^{7}$° C./s which can be calculated in accordance with the formula $\Delta T/t$, where $\Delta T$ is the temperature difference between the temperature of the plasma entering the nozzle $T_2$ and the temperature of the plasma in the quenching zone $T_1$, with the average temperature entering the nozzle $T_2$ being calculated by the formula $T_2=T_1+W_p/\dot{m}C_p$, where $T_1$ is room temperature; $W_p$ is the energy input to the plasma, $\dot{m}$ is the mass flow rate of the carrier gas; $C_p$ is the specific heat of the carrier gas; and t is the time for the plasma stream to travel from the plasma torch to the quenching zone, where t can be calculated by the formula t=length of nozzle/velocity of plasma gas entering the nozzle, to generate in situ nanometer sized tungsten catalyst particles, which act as the catalyst and nucleation sites for the formation of carbon nanostructures having a diameter of from about 2 to about 30 nm within the plasma stream, which are then collected.

* * * * *